W. M. BRADSHAW.
ELECTRICAL MEASURING INSTRUMENT.
APPLICATION FILED AUG. 7, 1917.

1,408,071.  Patented Feb. 28, 1922.

WITNESSES:
Olen E. Bee
J. H. Procter

INVENTOR
William M. Bradshaw
BY
Wesley G. Carr
ATTORNEY

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,408,071.  Specification of Letters Patent.  Patented Feb. 28, 1922.

Application filed August 7, 1917. Serial No. 184,805.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to excess-demand meters.

One object of my invention is to provide an induction type of meter that shall have a constant retarding torque under all conditions.

Another object of my invention is to provide a meter of the above-indicated character that shall be inexpensive to construct and effective in its operation.

In practicing my invention, I provide a magnetizable core having a central upwardly-extending member, two inwardly-extending side members and four downwardly-extending members or portions. The windings that are disposed on the downwardly-extending portions or members are so connected that two opposing torques are developed by the armature. One of the torques is adapted to be constant and the other is adapted to vary in accordance with the load to be measured. Thus, if the constant torque corresponds to the maximum permissible load or demand, all loads in excess of this value or the excess demand may be measured.

Figure 1:
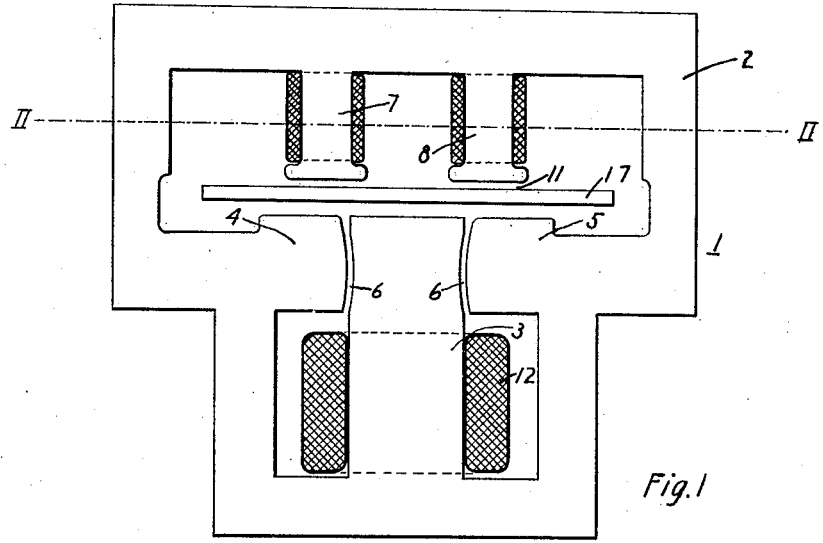
Figure 2:
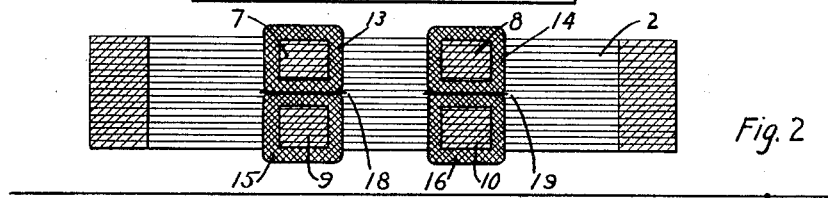

In the accompanying drawings, Figure 1 is a front elevational view of a measuring instrument embodying my invention; Fig. 2 is a view, taken along the line II—II of Fig. 1, and Fig. 3 is a diagrammatic view of a measuring instrument illustrating the operation of my invention.

The measuring instrument 1 comprises a laminated magnetizable core 2 having a central leg or member 3, two side members 4 and 5 that are spaced from the central member 3, at one end, by air gaps 6, and downwardly-extending members 7, 8, 9 and 10 that are spaced from the central member 3 and the side members 4 and 5 by an air gap 11. A potential winding 12 surrounds the central member 3, and current windings 13, 14, 15 and 16 are disposed around the members 7, 8, 9 and 10, respectively. An armature 17 is disposed in the air gap 11 and is adapted to be rotated by the shifting field therein, as hereinafter more fully set forth.

The windings 13 and 14 are so connected in series that, in co-operation with the winding 12, they tend to turn the armature 17 in one direction. Similarly, the windings 15 and 16 are connected in series and, in co-operation with the winding 12, tend to turn the armature 17 in the opposite direction. Thus, if the current in the windings 13 and 14 is maintained at a constant value, which may correspond to the maximum permissible load or demand, the armature 17 will not turn in its correct direction to register the energy to be measured until the energy exceeds the maximum permissible value or demand; in which case, the torque developed by the windings 15 and 16 will overcome the torque developed by the windings 13 and 14 and thus cause the armature 17 to be actuated in its correct direction. Barrier members 18 and 19 are disposed between the windings 13 and 15 and 14 and 16, respectively, for the purpose of precluding inductive relationship between the same.

Figure 3:
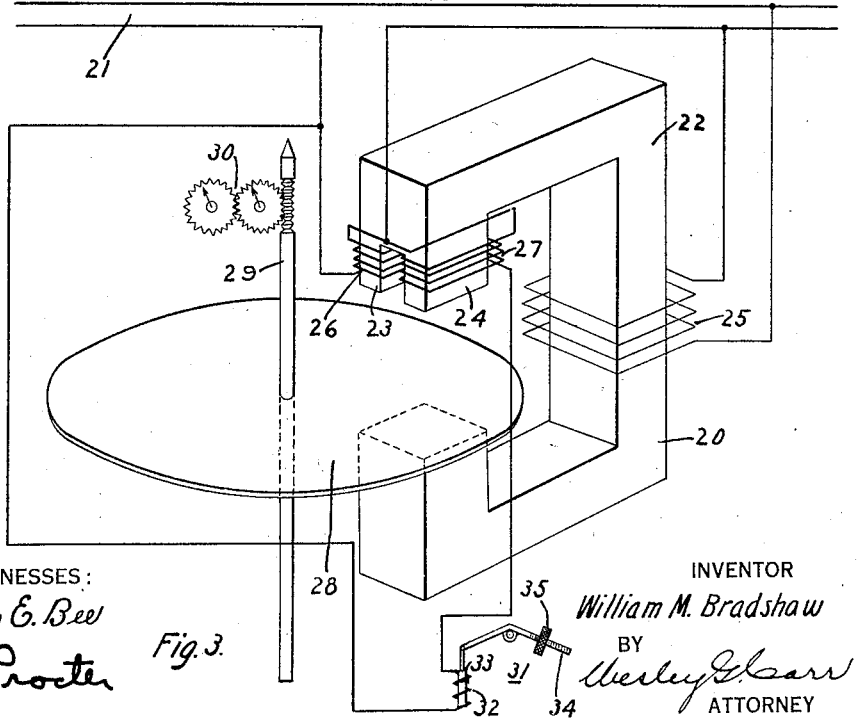

In order to more fully understand the operation of my invention, reference may be had to Fig. 3 of the drawings, in which a measuring instrument 20 is adapted to integrate the energy traversing the circuit 21 when such energy exceeds a predetermined value. The meter 20 comprises a magnetizable core member 22 having two pole pieces 23 and 24 at one of its poles, a potential winding 25, a current winding 26 disposed around the pole piece 23, a current winding 27 disposed around the pole piece 24, an armature 28 that is mounted on a shaft 29, an integrating device 30 and a constant-current regulating device 31.

Two of the terminals of the windings 26 and 27 are connected together. The other terminal of the winding 26 is connected, through the winding 32 of the regulating device 31, to the other terminal of the winding 27, and the circuit, thus constituted, is connected in series with one conductor of the circuit 21.

The potential winding 25 is connected across the two conductors of the circuit 21. The regulating device 31 comprises the winding 32, a magnetizable core member 33 and a lever arm 34 having an adjustable weight member 35 thereon for controlling the reactance in circuit with the winding 27 and, consequently, the current traversing the same.

The regulating device 31 is so adjusted that, irrespective of how much current traverses the circuit 21, a pretermined current will traverse the winding 27. The winding 27 co-operates with the winding 25 to turn the armature 28 in one direction and the winding 26 co-operates with the winding 25 to tend to turn the armature 28 in the opposite direction. Since the current traversing the winding 27 corresponds to the maximum load or demand on the meter 21, the armature 28 will not turn in its correct direction unless the current traversing the winding 26 exceeds that traversing the winding 27. Under this condition, the armature 28 will be actuated in accordance with the excess demand or, in other words, in accordance with the energy traversing the circuit 21 less a constant value which corresponds to the maximum permissible unmetered load or demand.

It will be understood that some means must be provided to prevent the integrating mechanism from operating in the wrong direction. This means may comprise either a ratchet for preventing backward movement of the armature or the integrating mechanism may be adapted to operate only when the armature turns in one direction.

The principal advantage of my invention is that standard watthour meters may be easily altered to constitute excess-demand meters, but it will be understood that I do not limit my invention to the specific structures illustrated, as many changes may be made therein without departing from the spirit and scope of the invention as set forth in the appended claims.

I claim as my invention:

1. An electrical measuring instrument comprising a magnetizable core having a central upwardly projecting member, side members separated from the central member by air gaps and two pairs of downwardly projecting members separated from each other and from the central and side members by air gaps, an armature and means for so energizing the central member and the respective pairs of downwardly projecting members that opposing forces are developed in the armature.

2. An electrical measuring instrument comprising a magnetizable core having a central upwardly projecting member, side members separated from the central member by air gaps and four downwardly projecting members separated from the central and side members by an air gap, an armature, and windings for so energizing the central member and the downwardly projecting members that two opposing forces are normally imparted to the armature.

3. An excess-demand meter comprising a magnetizable core having an upwardly extending central member, side members separated from the central member by air gaps and four downwardly extending members, an armature, a regulator, and windings for the central and downwardly extending members, a portion of the windings on the downwardly extending members being so connected to the regulator that the armature will tend to turn backwardly up to a predetermined load and forward for all other loads.

4. An excess-demand meter comprising a magnetizable core having an upwardly extending central member, side members separated from the central member by air gaps and four downwardly extending members, an armature, windings for the central and downwardly extending members, the windings on the central and downwardly extending members being so connected that two opposing torques will be developed in the armature under all conditions.

5. In an excess-demand meter the combination with a constant-current regulator, of a magnetizable core having an upwardly extending central member, side members, downwardly extending members, an armature disposed between the downwardly extending and the central member, and windings for the central and downwardly extending members, the regulator being so connected to a portion of the windings on the downwardly extending members that a constant retarding torque is developed in the armature.

In testimony whereof I have hereunto subscribed my name this 30th day of July, 1917.

WILLIAM M. BRADSHAW.